US006089975A

United States Patent [19]
Dunn

[11] Patent Number: 6,089,975
[45] Date of Patent: Jul. 18, 2000

[54] ELECTRONIC GAMING APPARATUS WITH MEANS FOR DISPLAYING INTERACTIVE ADVERTISING PROGRAMS

[76] Inventor: Jerry B. Dunn, 2643 Red Rock #202, Las Vegas, Nev. 89012

[21] Appl. No.: 08/895,151

[22] Filed: Jul. 16, 1997

[51] Int. Cl.[7] ........ A63F 13/00
[52] U.S. Cl. ........ 463/16
[58] Field of Search ........ 463/16, 17, 18, 463/19, 20, 24; 273/434

[56] References Cited

U.S. PATENT DOCUMENTS

| | | | |
|---|---|---|---|
| 4,824,121 | 4/1989 | Beall et al. | 463/36 |
| 5,741,183 | 4/1998 | Acres et al. | 463/42 |
| 5,937,390 | 8/1999 | Hyodo | 463/19 |

FOREIGN PATENT DOCUMENTS

| | | | |
|---|---|---|---|
| 2268861 | 1/1994 | United Kingdom | 273/434 |
| 93/22017 | 11/1993 | WIPO | 273/434 |

*Primary Examiner*—Valencia Martin-Wallace
*Assistant Examiner*—John Paradiso
*Attorney, Agent, or Firm*—Philip D. Junkins

[57] ABSTRACT

A system for providing interactive video programs of promotional advertising and information presentations to one or more casino or gaming establishment type of units of electronic video gaming machines each having a video game display screen. Each gaming machine is electronically interconnected to a central computer system of the casino or establishment and is provided with a programmed integrated circuit interface board for receiving the transmission of a video program of promotional advertising and information presentations to the video display screen of each gaming machine when such machine is not in game play by a game player. The integrated circuit interface board is programmed to terminate the transmission of the advertising and information program at each gaming machine upon the activation of game play of the machine by a game player. The program of interactive advertising and information presentations is supplied to the central computer system of the casino or gaming establishment by video tape or CD-Rom disk players or by telephonic modem interconnects.

14 Claims, 2 Drawing Sheets

ELECTRONIC GAMING APPARATUS WITH MEANS FOR DISPLAYING INTERACTIVE ADVERTISING PROGRAMS

BACKGROUND OF THE INVENTION

1. Field of the Invention

The present invention relates in general to electronic gaming apparatus such as video slot machines, video poker machines, video blackjack machines and video keno machines of the types played in casinos and other gaming establishments. The invention further relates to both single game or multi-game devices which: accept coins or tokens, paper money, credit and debit cards, and value coupons in payment for play; and receive player tracking cards for crediting play action and play points to a player's casino or establishment play account.

2. Brief Description of the Prior Art

Casinos and certain other business establishments have gaming apparatus such as video slot machines, video poker machines, video blackjack machines, video keno machines and multi-game machines in which a player can insert coins, tokens, paper money, value coupons and even credit and debit cards for play-wager purposes with the hope, upon actuation of game play mechanisms (pull handles or push buttons), of obtaining winning combinations of displayed game elements with an appropriate related win pay-out from the machine. Further, a number of latest casino gaming devices reward players for the attainment of a designated game winning event with a follow-up chance to obtain a further monetary or coupon with pay-out or major prize award by player activation of an electronic spin roulette-type prize wheel associated with the basic game machine.

Gaming devices of the above described type are generally interconnected electronically to the casino's or establishment's central computer system which receives all of the player's betting and winning outcome information from all gaming devices linked to the system. Such computer systems also receive and account for all player identification information and player tracking information related to the player's game play activity and wager volume. In addition, the betting and winning outcome information for a select number of like gaming machines in a casino or other establishment may be linked to a plurality of remotely located gaming facilities with like gaming machines for the purpose of providing players of such machines at multiple sites with the opportunity of winning progressive jackpot awards.

Most of the present electronic gaming machines of the types described above includes an upper illuminated pay table showing the win payout schedule related to the game or games that are played via the machines and a lower video screen via which a game's plays and win/lose/draw or match results are displayed to the game player.

The present invention is directed to utilization of the lower video display screen, of the foregoing wide variety of gaming machines for advertising display purposes during periods when such machines are not being actively utilized by a player.

OBJECTS OF THE INVENTION

It is, therefore, a principal object of the present invention to provide electronic gaming apparatus of the types described above which include special means to display promotional advertising, as selected by the apparatus owner/operator, via the video display screen during periods when such apparatus is not being actively operated by a game player.

It is a further object of the invention to provide electronic gaming apparatus of the types described above for use in casinos and other gaming establishments wherein such apparatus is interconnected to a central computer system which transmits promotional advertising material to such apparatus for display via the video display screen of the apparatus during periods when such apparatus is not being utilized by a game player.

It is a still further object of the invention to provide electronic gaming apparatus of the types described above for use in casinos and other gaming establishments wherein such apparatus is interconnected to a central computer system which includes special means for receiving promotional advertising material, as selected by the owner/operator of the apparatus, from an advertising distribution center and for transmitting such advertising material to such gaming apparatus for display via the video display screen of the apparatus during periods when the apparatus is not in game play.

It is another object of the invention to provide for multiple units of electronic gaming apparatus, of the types described above, in a casino or other gaming establishment, means for interconnecting such units to a central computer system of the casino or establishment which includes special means: for receiving promotional advertising script and/or graphics from an advertising distribution source, external of the casino or other gaming establishment; for transmitting such advertising material to such units of gaming apparatus for display via the video display screens of such units during the units' respective periods of non-play; and for interrupting the transmission of such advertising material to each respective unit when such unit is activated for play by a game player.

It is yet another object of the invention to provide for electronic gaming apparatus means for interconnecting multiple units of such apparatus with a central computer system which transmits promotional advertising material, as selected by the apparatus owner/operator, to such units for display via the video display screen of such apparatus during periods when such apparatus units individually are not being utilized by a game player.

Other objects and advantages of the invention will be apparent from the following summary and detailed descriptions of the invention, taken together with the accompanying drawing figures.

SUMMARY OF THE INVENTION

The present invention relates to electronic gaming apparatus and methodology for use in casinos and other gaming establishments wherein such apparatus is interconnected to a central computer system which transmits interactive promotional advertising material to such gaming apparatus for display via the video display screen of the apparatus during periods when such apparatus is not being utilized by a game player. The promotional advertising material, in the form of interactive script and/or graphics, is pre-selected by the owner/operator of the apparatus and is received from an advertising production and/or distribution source which may be external of the casino or other gaming establishment. Thus, the promotional advertising material may be fed to the computer system of the casino or gaming establishment directly via video tape or CD-Rom disk, or indirectly from an external source via wired or wireless telephonic modem interconnection.

The central computer system of the casino or other type of gaming establishment is interconnected to each unit of electronic gaming apparatus and its video game display screen via an interface computer board which functions to provide the selected promotional advertising material to the gaming apparatus for display via the game display screen of the apparatus unit when the gaming unit is not activated for play and in play by a game player. Upon activation of the game play sequence or mode of the apparatus unit the interface board interrupts the display of the promotional advertising material and maintains the non-display mode of the apparatus until a limited time period of non-game-play is experienced by the apparatus unit. The interface computer board may also be designed to provide the game apparatus unit with a periodic or sequenced display of advertising material during non-game-play periods.

The apparatus and methodology of the invention is applicable to a wide variety of gaming apparatus including video slot machines, video poker machines, video blackjack machines, video keno machines and multi-game machines via which a player may, through a single gaming machine, select the game type to be played. The gaming apparatus, regard-less of its game or multi-game type, is interconnected to a central computer of the casino or gaming establishment which receives and processes layer identification and player tracking information and the player's betting volume and winning outcome information. Thus, interconnection of each gaming apparatus unit within a casino or other gaming establishment for accomplishing the distribution of promotional advertising material is easily accomplished via the installation of the interface computer board at each unit with interconnection between the units display screen and the central computer system of the casino or gaming establishment.

BRIEF DESCRIPTION OF THE DRAWING FIGURES

DETAILED DESCRIPTION OF A PREFERRED EMBODIMENT OF THE INVENTION

Figure 1:
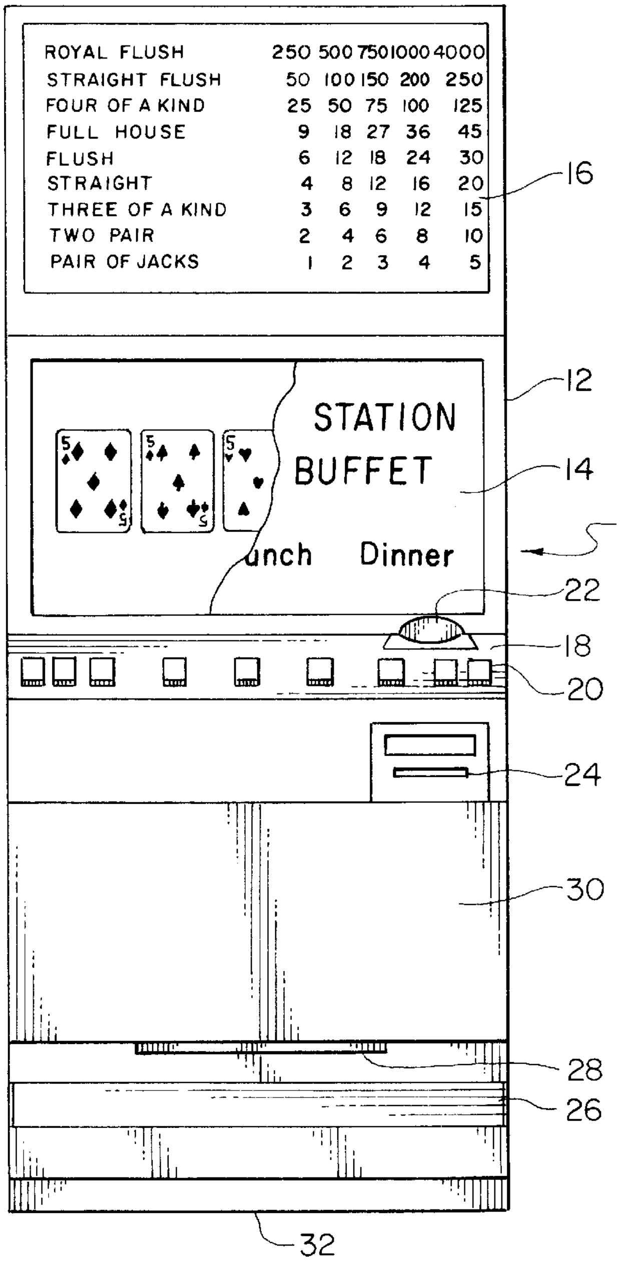
FIG. 1 is a front elevation view of one embodiment of the electronic gaming apparatus of the present invention.
Figure 2:
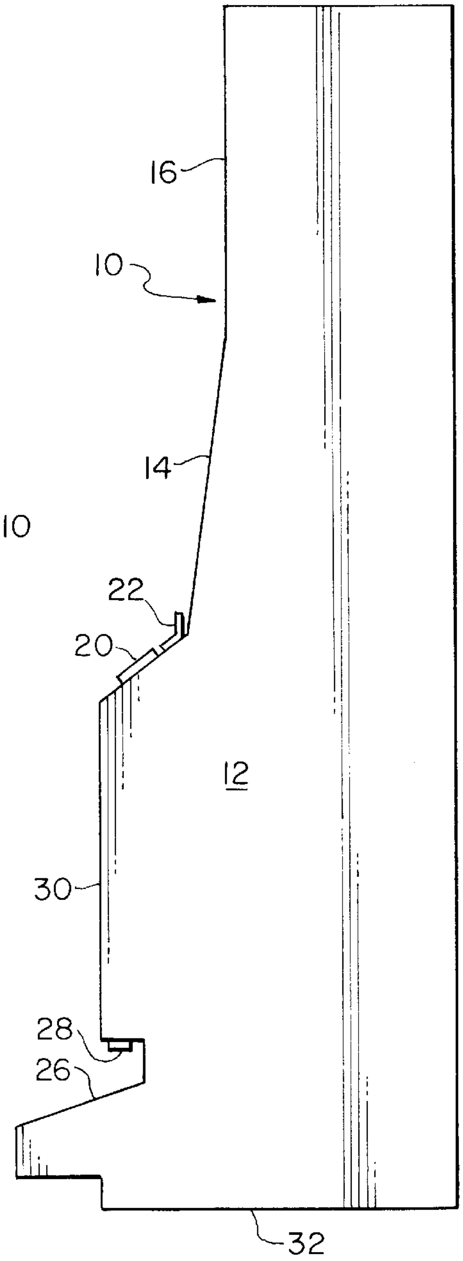
FIG. 2 is a side elevation view of the apparatus embodiment of FIG. 1.

The present invention relates to electronic gaming apparatus and methodology for use in casinos and other gaming establishments. Such apparatus includes a wide variety of gaming machines such as video slot machines, video poker machines, video blackjack machines and video keno machines and multi-game machines, i.e., gaming machines which provide a player with a choice of such games. A preferred embodiment of the invention, as illustrated in FIGS. 1 and 2 of the drawing sheets, comprises an electronic video draw poker machine 10 with its components contained within or presented on the face of a principal piece of cabinetry 12. The illustrated gaming machine is designed and functions to replicate the play of a 5-card hand of draw poker with the cards dealt electronically in random fashion from a deck of 52 standard playing cards and with the hand of cards displayed on the machine's video display screen 14.

Typically, the player of the illustrated video poker gaming apparatus is not playing against the hand of any other player or against a dealer's hand, the player is simply attempting to achieve the highest ranking poker hand possible from the five cards electronically displayed to the player. After the initial deal of a five card hand the player selects which of the five cards he or she desired to hold (or discard depending on the form of the gaming machine). The selection of "held" or discharged cards is made by the player's depression of one or more of the finger depression buttons or keys which are normally placed in alignment with the dealt cards. Following the player's selection of cards, the draw poker machine then displays replacement cards for the cards the player has discarded. The player wins or loses the poker game based on conventional poker hand rankings for the resulting displayed five card hand. A payout table 16 is established based on the number of coins or tokens wagered by the player and the type of poker hand achieved. The classic video poker machine has been modified to use jokers as wild cards or to use duces (or other cards) as wild cards. Thus, "Joker's Wild" and "Deuces Wild" draw poker gaming machines still display to the player a single five card hand and allow the player to discard unwanted cards and receive replacement cards. The payout table is modified to recognize the differing odds for achieving various wining poker hands when wild cards are involved.

As illustrated in FIG. 1, the preferred embodiment of a gaming machine of the present invention includes a game control panel 18 which presents a series of game control and selection buttons or keys 20 including the previously mentioned "hold" or "discard" keys aligned with the five card frames displayed on the video display screen 14 during game play. Other buttons or keys are provided on the game control panel 18 to operate other functions of the gaming machine including the functions of card deal, card draw, cashout, maximum payment of game credits, and single payment of game credits. Whenever a player achieves a winning hand, a credits LED display (not shown on the display screen) is incremented by the amount that the player has won.

A coin entry 22 is shown on the control panel 18 for receipt of coins or tokens utilized by a player to activate game play and to build credit units for betting by the player. Alternatively, a player may utilize paper currency or casino paper script for game play by insertion of such currency or script into payment slot 24. Typical video poker gaming machines of the type illustrated include a coin discharge tray 26 at a lower position of the game cabinet 12 with coins being dischargeable into the coin tray via a coin chute 28. A front cabinet panel 30 may include game instructions and/or logos, information and graphics relating to the casino or gaming establishment. A base portion 32 of the cabinet positions the gaming machine appropriately on its supporting table or machine bank podium.

It is to be noted that the video display screen 14, as shown in FIG. 1, presents a split view of video imaging to illustrate the objectives of the present invention. Thus, the left portion of the screen shows several of the five cards dealt and displayed to a player during game play. The right portion of the screen shows part of a casino advertisement which is periodically displayed on the screen during periods when the gaming apparatus is not activated for play and in play by a game player. In accordance with the present invention, the casino or other gaming establishment implementing the promotional advertising system of the invention into its electronic gaming apparatus units, is provided means to advertise and promote (via period video presentations): the establishments many features and facilities including restaurants, shops, lounges, shows, etc.; other local entertainment opportunities, tourists attractions and shopping facilities; traffic and travel information; and a wide variety of other information of current or future interest to game players and interested by-standers.

As previously indicated, the promotional advertising material, to be periodically video displayed via gaming apparatus units not in active play within a casino or other gaming establishments, is fed to the central computer system of the casino or gaming establishment directly via video tape recordings or CD-Rom disks, or indirectly from an external advertising production and/or distribution source via wired or wireless telephonic modem interconnection, as selected and/or directed by the casino or establishment owner/management. The promotional advertising program content and segment sequence timing is dictated by casino or gaming establishment owner/management with the cost of the program typically paid for by the parties represented in the ad sequences. The cost of the integrated circuit interface computer board for each gaming unit and its installation charge may be borne by the casino or gaming establishment benefitting by the displayed advertising program and/or paid for or cost-shared by the parties represented in the ad sequences. Within the scope of the promotional advertising system of the invention it is possible to readily change the content and sequence of the video ads by rapid computer modification of the video tape, CD-Rom disk and/or modem presentations communicated to the central computer system of a casino or other gaming establishment applying the system to its video gaming apparatus units.

Figure 3:
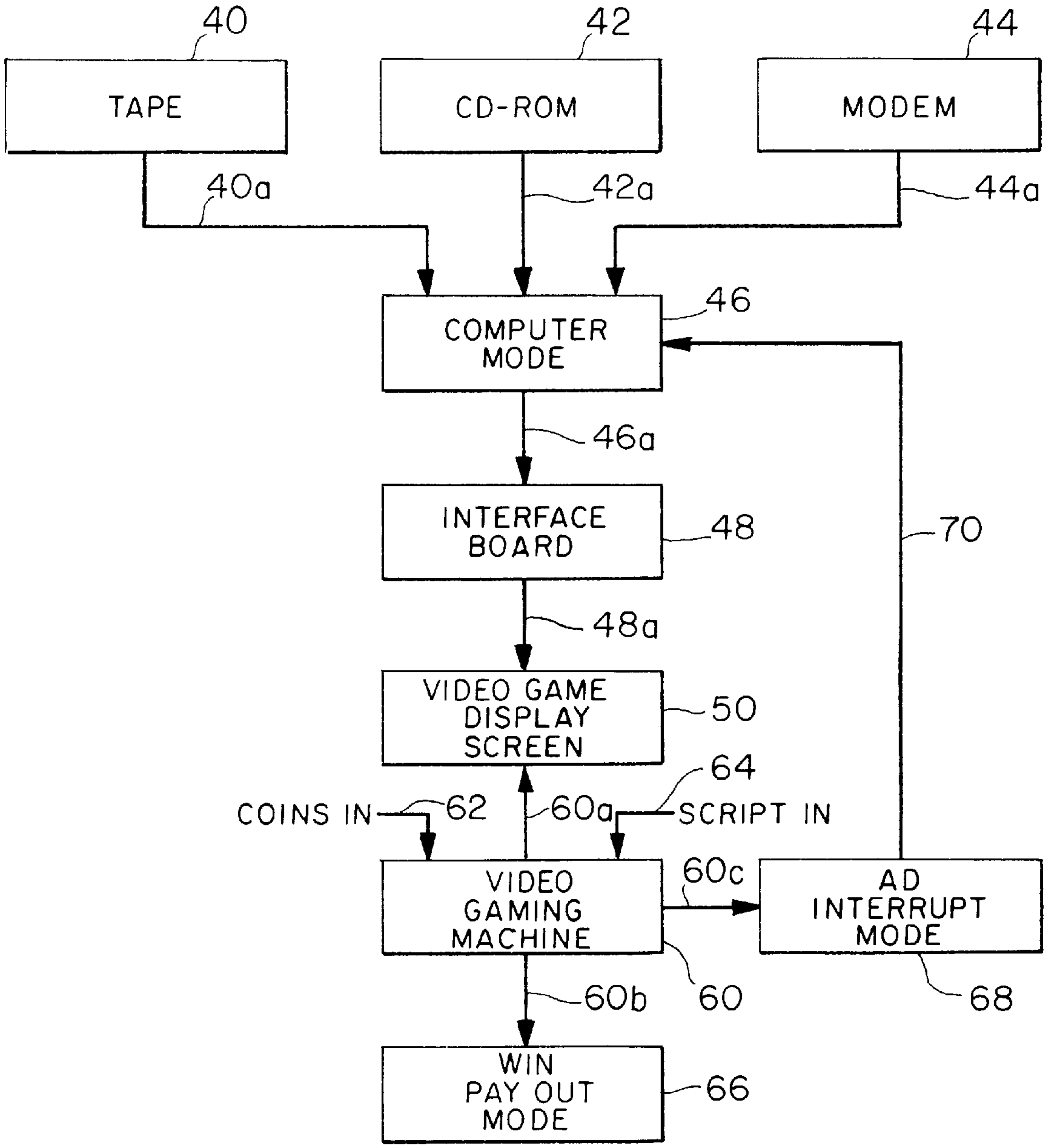
FIG. 3 is a diagrammatic view of the operational flow chart for the gaming apparatus of the invention.

Referring now to FIG. 3 of the drawing sheets, there is presented a diagrammatic view of the operational flow scheme of the gaming apparatus of the invention. The context of, or setting for, the flow scheme of FIG. 3 is a casino or other gaming establishment with a central computer system interconnected to the variety of video gaming machines of the casino or establishment which each have a video screen for presenting the game play and results to a player. Thus, in accordance with the present invention a program of interactive promotional advertisements and informational presentations is provided to the central computer system of a subscribing casino or gaming establishment via video tape input 40, CD-Rom disk input 42 or modem input 44. The central computer system mode 46 of the casino or establishment receives such program input via a selected intercommunication means 40*a*, 42*a* or 44*a*, respectively, and processes the selected program input digitally for transmission through a multiplicity of gaming machine interconnects 46*a* to the respective computer system IC interface boards 48 of the multiplicity of video game machines of the casino or gaming establishment.

The respective gaming machine IC interface boards 48 of the promotional advertising system of the invention are interconnected via interconnect means 48*a* to the video game display screens 50 of each gaming machine 60 and the respective machine's internal electronic programs and systems for game activation, game play game result display and game play termination. Each respective video gaming machine 60 interfaces with the machine's video display screen 50 through interconnect means 60*a*. When a respective gaming machine 60 is inactive, i.e., experience a period or periods of non-play, the respective interface board 48 is activated thereby transmitting to the video screen 50, in cyclic and/or periodic program sequences, the promotional advertising and information presentations selected by the casino (or other gaming establishment) owner/operator. Each program sequence (elapsed time of perhaps partial minutes to several minutes) may be continuously re-run or may be periodically interrupted for program rest periods whereupon the electronics of the gaming machine 60 returns the idle video screen display to a showing of normal game-end display subject matter such as the last game hand of cards.

When a potential game player addresses a video gaming machine 60 via the introduction of coins or tokens 62 through a coin entry such as entry 20 of FIG. 1, or the introduction of paper currency or script into a payment slot such as slot 24 of FIG. 1, the gaming machine's ad interrupt mode 68 is activated via play interconnect 60*c*. The ad interrupt mode thereupon signals the computer mode 46 via interconnect 70 to terminate the transmission of the promotional advertisement and information presentations to the game display screen via interface board 48. Termination of the transmission of the advertising program and information presentations is continued so-long-as the machine continues to be utilized by the game player. Upon termination of game play by a player's activation of the machine's win payout mode 66 or upon the cessation of play of the machine for a specified period game play out time (perhaps 1, 2 or more minutes), the machine's IC interface board 48 reactivates the promotional advertising and information presentations of the central computer system mode 46 of the casino or gaming establishment in-so-far as the transmission of such presentations to the idle machine.

Thus, the system and gaming apparatus of the present invention, as described hereinbefore and as illustrated in FIGS. 1, 2 and 3 of the drawing sheets, provides casino and gaming establishment owners and operators with a unique means of interactively advertising and promoting the full features and facilities of the casino or establishment at a vast number of display points therein via idle gaming machines. The present system and apparatus also provides customers of the casino or establishment with a wide variety of information respecting other entertainment opportunities, tourist attractions, shopping facilities, traffic and travel information, and other information of current or future interest.

While the invention has been described in connection with a preferred embodiment of a video poker gaming machine, it is not intended to limit the scope of the invention to the particular form of video gaming machine as set forth but, on the contrary, it is intended to cover such alternatives, modifications and equivalents as may be included within the spirit and scope of the invention as defined by the appended claims.

What is claimed is:

1. A system for providing interactive promotional advertising and information presentations to one or more casino or gaming establishment type of units of electronic video gaming apparatus each having a video game display screen comprising:

a) a central computer system electronically interconnected to said one or more units of video gaming apparatus;

b) means for communicating to said computer system a video program of interactive promotional advertising and information presentations;

c) programmed integrated circuit interface boards each interconnected to said central computer system and to said one or more units of video gaming apparatus for the transmission of said video program of advertising and information presentations from said computer system to the video display screen of each of said units of said gaming apparatus when said one or more units of video gaming apparatus are not in game play by a game player; and d) means at each of said one or more units of video gaming apparatus interconnected to the programmed integrated circuit interface board thereof for terminating the transmission of said program of advertising and information presentations to the video game display screen thereof upon the activation of game play of said apparatus by a game player.

2. A system for providing interactive promotional advertising and information presentations to one or more casino or gaming establishment type units of electronic video gaming apparatus as claimed in claim 1 wherein the means for communicating said video program of interactive promotional advertising and information presentations to said computer system is selected from the group consisting of video tape and CD-Rom disk players and telephonic modem interconnects.

3. A system for providing interactive promotional advertising and information presentations to one or more casino or gaming establishment type units of electronic video gaming apparatus as claimed in claim 1 wherein the means at each of said one or more units of video gaming apparatus for terminating the transmission of said video program of advertising and information presentations to the video game display screen of each gaming unit upon the activation of game play comprises detection circuitry of said interface board for detection of the deposit into said apparatus of game play coins or tokens or monetary bills or script.

4. A system for providing interactive promotional advertising and information presentations to one or more casino or gaming establishment type units of electronic video gaming apparatus as claimed in claim 1 wherein the electronic video gaming apparatus of the system includes electronic gaming apparatus selected from the group consisting of video slot machines, video poker machines, video blackjack machines, video keno machines and video multi-game machines.

5. Apparatus for displaying interactive promotional advertising and information presentations on one or more casino or gaming establishment electronic video gaming machines via the video game display screens of each of said gaming machines comprising:

a) a central computer system electronically interconnected to said one or more video gaming machines;

b) means for providing said computer system with a repeating video program of interactive promotional advertising material and informational presentations;

c) a programmed integrated circuit interface board interconnected to the video game display screen of each of said one or more video gaming machines with each of said boards interconnected to said central computer system for the transmission of said repeating video program of said advertising material and informational presentations to the video game display screen of each of said gaming machines when said one or machines are not in game play by a game player; and d) means at each of said one or more gaming machines interconnected to the programmed integrated circuit interface board thereof for terminating the transmission of said repeating video program of interactive promotional advertising and informational presentations to the video game display screen thereof upon the activation of game play of said machine by a game player.

6. Apparatus for displaying interactive promotional advertising and information presentations on one or more casino or gaming establishment electronic video gaming machines as claimed in claim 5 wherein the means for providing a repeating video program of interactive promotional advertising material and informational presentations to the central computer system of said apparatus is selected from the group consisting of video tape and CD-Rom disk players and wired and wireless telephonic modem interconnects.

7. Apparatus for displaying interactive promotional advertising and information presentations one one or more casino or gaming establishment electronic video gaming machines as claimed in claim 5 wherein the means at each of said one or more gaming machines for terminating the transmission of said repeating video program of interactive promotional advertising and information presentations to the video display screen thereof upon the activation of game play comprises circuitry of said integrated circuit interface board for the detection of the deposit into said one or more gaming machines of game play coins or tokens or monetary bills or script.

8. Apparatus for displaying interactive promotional advertising and information presentations on one or more casino or gaming establishment electronic video gaming machines as claimed in claim 5 wherein said electronic video gaming machines are selected from the group consisting of video slot machines, video poker machines, video blackjack machines, video keno machines and video multi-game machines.

9. A method for displaying interactive promotional advertising and information presentations on one or more casino or gaming establishment electronic video gaming machines via the video game display screens of each of said gaming machines comprising:

a) interconnecting a central computer system of said casino or gaming establishment electronically to each of said one or more video gaming machines, each of said machines have independent game activation means;

b) providing said computer system with a repeating video program of interactive promotional advertising material and informational presentations;

c) interconnecting a programmed integrated circuit interface board to the video display screen of each of said one or more video gaming machines and interconnecting each said interface board to said central computer system for the transmission of said repeating video program of said advertising material and informational presentations to the video game display screen of each of said gaming machines when said one or more machines are not in game play by a game player; and d) interconnecting the game activation means of each of said one or more video gaming machines to the programmed integrated circuit interface board of each of said machines whereby upon activation of game play of one or more of said gaming machines the transmission of said repeating video program of interactive promotional advertising material and informational presentations is terminated and the video game display screen of each of said machines displays game play information and graphics.

10. The method for displaying interactive promotional advertising and information presentations on one or more casino or gaming establishment electronic video gaming machines as claimed in claim 9 wherein said repeating video program of promotional advertising material and informational presentations is provided to the central computer system of said casino or gaming establishment via transmitting a video tape recorded program of said advertising material and informational presentations to said central computer system.

11. The method for displaying interactive promotional advertising and information presentations on one or more casino or gaming establishment electronic video gaming machines as claimed in claim 9 wherein said repeating video program of promotional advertising material and informational presentations is provided to the central computer system of said casino or gaming establishment via transmitting a CD-Rom disk recorded program of said advertising material and informational presentations to said central computer system.

12. The method for displaying interactive promotional advertising and information presentations on one or more casino or gaming establishment electronic video gaming machines as claimed in claim 9 wherein said repeating video program of promotional advertising material and informational presentations is provided to the central computer system of said casino or gaming establishment via transmitting said program via a telephonic modem from an external program production source.

13. The method for displaying interactive promotional advertising and information presentations on one or more casino or gaming establishment electronic video gaming machines as claimed in claim 9 wherein termination of the transmission of the interactive promotional advertising and information presentation to the video display screen of said machines is effected by activation of game play by inserting game play coins or tokens or monetary bills or script into the game activation means of said machines by a game player.

14. The method for displaying interactive promotional advertising and information presentations on one or more casino or gaming establishment electronic video gaming machines as claimed in claim 9 wherein said electronic video gaming machines are selected from the group consisting of video slot machines, video poker machines, video blackjack machines, video keno machines and video multi-game machines.

* * * * *